(12) United States Patent
Generes et al.

(10) Patent No.: US 7,892,425 B2
(45) Date of Patent: Feb. 22, 2011

(54) STORMWATER PLUG FLOW SEPARATION SYSTEM

(75) Inventors: Ayn Generes, Portland, OR (US); Calvin Paul Noling, Portland, OR (US)

(73) Assignee: StormwateRx, LLC, Portland, OR (US)

( * ) Notice: Subject to any disclaimer, the term of this patent is extended or adjusted under 35 U.S.C. 154(b) by 85 days.

(21) Appl. No.: 12/380,336

(22) Filed: Feb. 25, 2009

(65) Prior Publication Data

US 2010/0213119 A1 Aug. 26, 2010

(51) Int. Cl.
*B01D 21/02* (2006.01)
(52) U.S. Cl. ............ 210/170.03; 210/521; 210/532.1; 210/538
(58) Field of Classification Search ............ 210/170.03, 210/513, 521, 532.1, 532.2, 538, 540
See application file for complete search history.

(56) References Cited

U.S. PATENT DOCUMENTS

| | | | | |
|---|---|---|---|---|
| 329,791 | A * | 11/1885 | Westinghouse | 210/538 |
| 1,332,882 | A * | 3/1920 | Boze | 210/532.2 |
| 1,422,674 | A * | 7/1922 | Cook | 210/532.2 |
| 1,902,171 | A * | 3/1933 | Kopp | 210/532.2 |
| 3,228,531 | A * | 1/1966 | Proudman | 210/532.2 |
| 4,208,291 | A * | 6/1980 | Ochoa | 210/532.1 |
| 6,077,448 | A * | 6/2000 | Tran-Quoc-Nam et al. | 210/521 |
| 7,022,243 | B2 * | 4/2006 | Bryant | 210/170.03 |
| 7,459,090 | B1 * | 12/2008 | Collings | 210/170.03 |
| 2008/0217227 | A1 * | 9/2008 | Pank | 210/170.03 |

* cited by examiner

*Primary Examiner*—Christopher Upton
(74) *Attorney, Agent, or Firm*—Ater Wynne LLP

(57) ABSTRACT

A water separation system includes a flow container includes a water inlet pipe; an inlet chamber in fluid communication with the water inlet pipe; a first settling chamber configured to settle grit and to float oil; an elevated, horizontally-oriented, elongate-rectangular water treatment flow inlet leading from the inlet chamber to the first settling chamber; a second settling chamber configured to settle solids; one or more plug flow conduits leading from the first settling chamber to the second settling chamber; an outlet chamber; an elevated treatment flow outlet disposed between the second settling chamber and the outlet chamber; a water outlet pipe in fluid communication with the outlet chamber; and an overflow mechanism disposed between the inlet chamber and the outlet chamber.

22 Claims, 2 Drawing Sheets

STORMWATER PLUG FLOW SEPARATION SYSTEM

FIELD OF THE INVENTION

The invention relates generally to the field of water flow management and treatment. More particularly, the invention relates to particulate separation or sequestration within a continuous water flow.

BACKGROUND OF THE INVENTION

Plug flow separation water management systems are known to provide for settling of grit and heavy particulate and to float oil and floatable particulate by providing one or more plug flow conduits between adjacent settling chambers within an in-line flow container. A prior STORMGATE SEPARATOR™ system used a circularly cross-sectioned transfer opening between an inlet chamber and a first settling chamber, that caused undesirable turbulence and poor plug flow control of water through the system. That system also featured a rectangular flow duct frame between the first and a second settling chamber. Flow of water through a second circular transfer opening between the second settling chamber and an outlet chamber was controlled by a rectangular baffle or orifice box covering the opening. The stormwater bypass weir elevation was field-adjustable. In the prior art STORMGATE SEPARATOR™ system the inlet pipe was aligned with the long axis of the first settling chamber but the outlet pipe was transverse to the long axis of the second settling chamber. In other words, the inlet and outlet pipes with the overflow weir therebetween were at right angles to one another rather than being aligned or in-line with excess stormwater bypass flow.

DETAILED DESCRIPTION OF THE PREFERRED EMBODIMENTS

Figure 1:
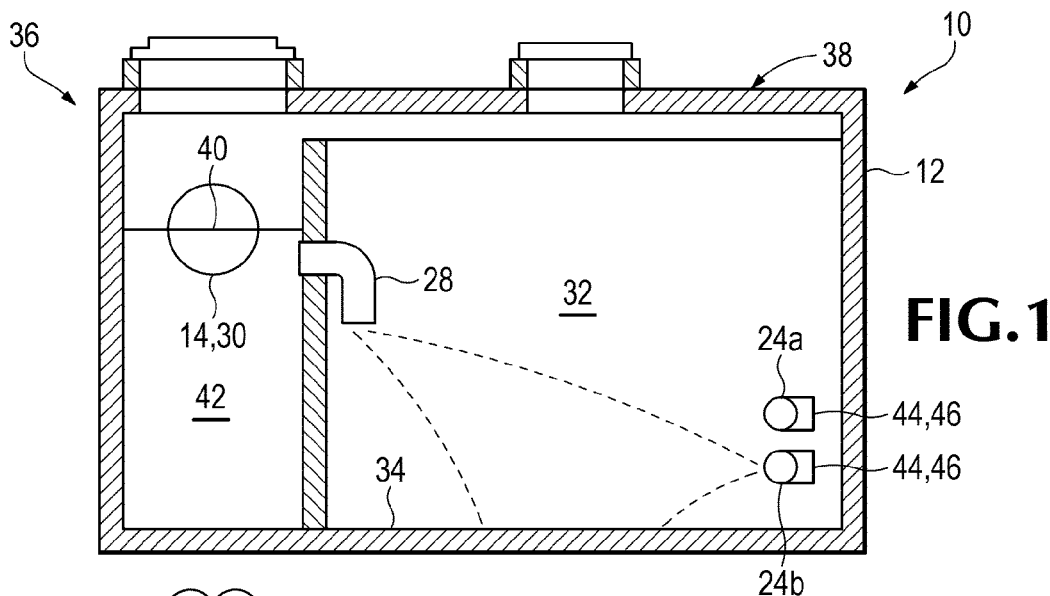
FIG. 1 is a front sectional view of the water plug flow separation system in accordance with one embodiment of the invention.
Figure 2:
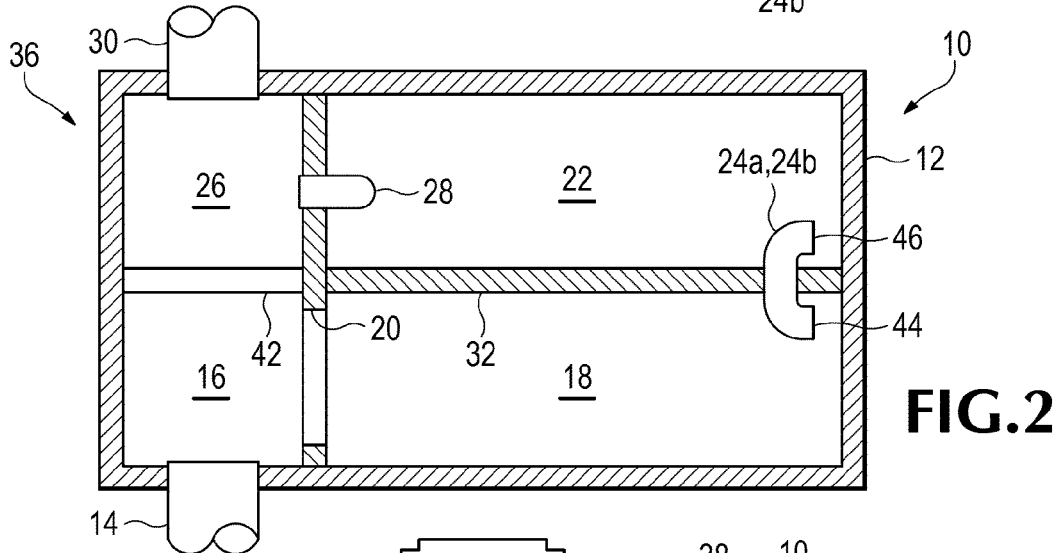
FIG. 2 is a top sectional plan view corresponding with FIG. 1.
Figure 3:
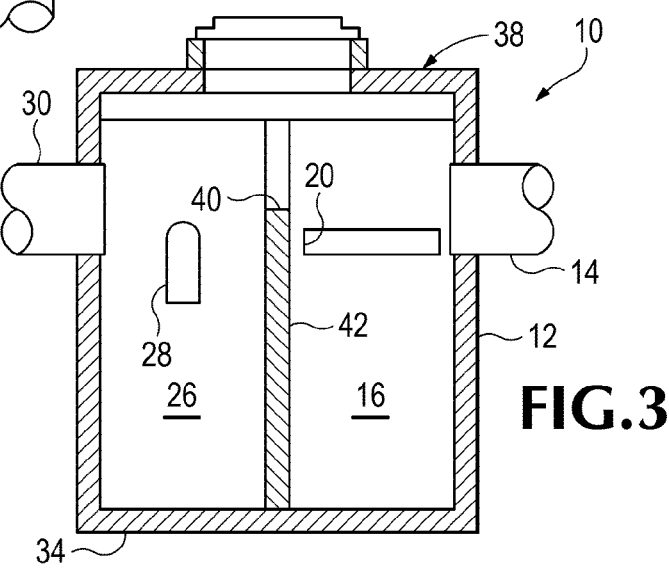
FIG. 3 is a left elevation corresponding with FIG. 1.

FIGS. 1-3 collectively illustrate the water plug flow separation system 10 in accordance with one embodiment of the invention. System 10 includes a stormwater flow container generally indicated at 12. Container 12 in turn includes (generally in the downstream direction of progressive stormwater flow separation) a water inlet pipe 14 or equivalent structure; an inlet chamber 16 in fluid communication with water inlet pipe 14; a first settling chamber 18 in fluid communication with inlet chamber 16 and configured to settle coarser solids and to float floatables; an elevated, horizontally-oriented, elongate-rectangular water treatment flow inlet 20 leading from inlet chamber 16 to first settling chamber 18; a second settling chamber 22 configured to settle finer solids; one or more (e.g. two) plug flow conduits 24a and 24b leading from first settling chamber 18 to second settling chamber 22; an outlet chamber 26 in fluid communication with second settling chamber 22; an elevated treatment flow outlet 28 disposed between second settling chamber 22 and outlet chamber 26; and a water outlet pipe 30 or equivalent structure in fluid communication with outlet chamber 26.

Those of skill in the art will appreciate that flow container 12 can be made of any suitable material or materials within the spirit and scope of the invention. For example, the various chambers can be formed of cast concrete, with or without any suitable reinforcement such as steel mesh or rebar, or they can be formed of steel plate material. Also for example, the water inlet and outlet pipes and one or more plug flow conduits can be made of polyvinylchloride (PVC). Also for example, the water treatment flow inlet 20 and the treatment flow outlet 28 can be made of simple openings within corresponding walls of the inlet chamber/first settling chamber and the second settling chamber/outlet chamber, whether the inner walls of the opening are reinforced, contiguous, or not.

A so-called baffle wall 32 in accordance with one embodiment of the invention extends upwardly from a base 34 of flow container 12 between first and second settling chambers 18 and 22, the baffle wall configured to subdivide a settling chamber region 36 (including first and second settling chambers 18 and 22) of flow container 12 and to mount one or more plug flow conduits 24a and 24b therein at a suitable elevation between base 34 and an open or closed top 38 of flow container 12. Also in accordance with one embodiment of the invention, system 10 further includes an overflow mechanism 40 disposed between inlet and outlet chamber 16 and 26. Those of skill in the art will appreciate that overflow mechanism 40 can take any form such as a simple weir at a top edge of an interior weir bypass wall 42 that at least partially separates inlet and outlet chambers 16 and 26. Those of skill in the art will appreciate that the upper extent of weir bypass wall 42 (the upper overflow limit) in accordance with one embodiment of the invention is at an elevation above base 34 of flow container 12 that is substantially equal to the elevation thereabove of the middle of inlet and outlet pipes 14 and 30. Overflow mechanism alternatively may be referred to herein as an internal high-flow bypass mechanism, as will be understood by those of skill in the art.

FIG. 2 illustrates in dashed lines some mean free paths of denser-than-water particulate or contaminant settlement onto base 34 of container 12. Those of skill in the art will appreciate that denser particulate settles directly or eventually on the bottom surface of first settling chamber 18, while other, less dense particulate may enter second settling chamber 22 via plug conduit 24a or 24b. Such particulate that enters second settling chamber 22 will settle as shown on the bottom of second settling chamber 22. Thus, the long path of water through the serpentine path of the first and second settling chamber and through the plug flow conduits effectively ensures optimum particulate and contaminant capture within settling region 36 of container 12.

Those of skill in the art will appreciate best from FIG. 2 that flow container 12 is configured to be generally rectangular in top plan view, in accordance with one embodiment of the invention. Those of skill also will appreciate that, in accordance with one embodiment of the invention, inlet and outlet pipes 14 and 30, along with inlet and outlet chambers 16, 26 (including or excluding weir bypass wall 42), occupy approximately one-third of a rectangle on one end of flow container 12. In accordance with this same embodiment of the invention, those of skill will appreciate that first and second settling chambers (including or excluding baffle wall 32) occupy the remaining approximately two-thirds of the rectangle on another end thereof. (Those of skill will appreciate that alternatively, but within the spirit and scope of the invention, first and second settling chambers 18 and 22 can occupy less than approximately two-thirds of the area of container 12, e.g. approximately one-half, while inlet and outlet chambers 16 and 26 occupy the remaining approximately one-half, to accommodate, for example, an integral pump within outlet chamber 26.) Finally, in accordance with one embodiment of the invention, one or more plug flow conduits 24a and 24b are disposed adjacent the far other end of flow container 12, i.e. the end away from or opposite the inlet and outlet chambers 16 and 26 and inlet and outlet pipes 14 and 30.

Figure 5:
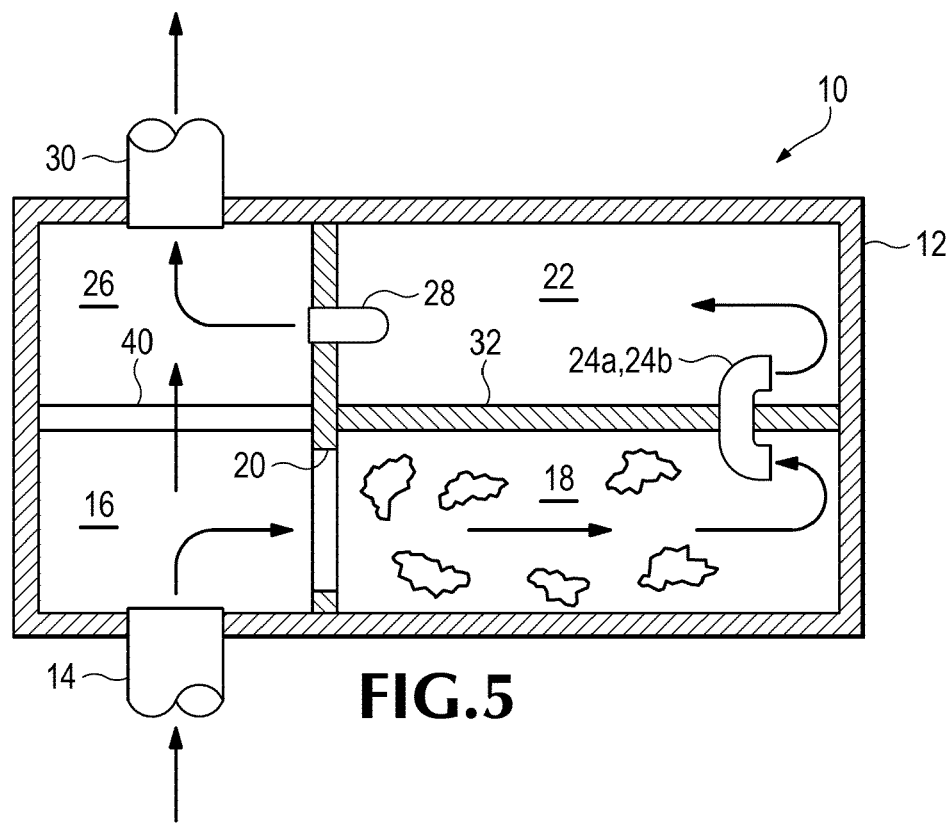
FIG. 5 is a top sectional view corresponding to FIG. 2 that schematically illustrates the flow of stormwater through the water plug flow separation system and the separation from the stormwater of solids and floatables.

Thus, from FIGS. 2 and 5, flow container 12 of system 10 is configured to advance water, e.g. stormwater containing pollutants, from inlet pipe 14 to outlet pipe 30 in what can be seen to be a serpentine path through flow inlet 20, inlet chamber 16, first settling chamber 18, one or more of plug flow conduits 24a and 24b, second settling chamber 22, outlet chamber 26, and flow outlet 28.

Moreover, those of skill in the art will appreciate from FIGS. 2 and 5 that one or more plug flow conduits 24a and 24b also are configured to define a serpentine water flow path in the approximate middle of the water's flow path through flow container 12. This is by virtue of the general U-shaped configuration of each of one or more plug flow conduits 24a and 24b (refer briefly to FIG. 2) and their repose in a substantially horizontal plane (refer briefly to FIG. 1) that is generally co-planar with base 34 resting on its generally horizontal ground support plane (not shown for purposes of clarity).

It will be understood that each of one or more plug flow conduits 24a and 24b (refer briefly to FIGS. 1 and 2) includes a plug flow inlet and a plug flow outlet such as inlet 44 and outlet 46, wherein the plug flow inlets and outlets of the one or more plug flow conduits face away from inlet and outlet chambers 16 and 26. It is this orientation of the generally U-shaped plug flow conduits within the generally serpentine water flow path within flow container 12 that further defines a serpentine path for stormwater contaminants being separated as the stormwater traverses system 10. It is the configuration and dimensioning of the plug flow conduits, e.g. their hydraulic calibration, that traps floatables, oil and accumulated solids behind baffle wall 32 separating first settling chamber 18 from second settling chamber 22.

Advantages of the serpentine flow container featured by the invented plug flow separation system are numerous. First, a serpentine stormwater separation path increases the distance between the treatment flow inlet 20 and treatment flow outlet 28, thereby reducing the likelihood of "short circuiting" treatment. Second, a serpentine water separation path decreases the footprint and material required for the container while increasing sediment or contaminant travel path. Thus greater efficiency of particulate and contaminant separation is achieved in a smaller space. The baffle walls help to dissipate the wind shear effect for open-top systems, in accordance with one embodiment, thereby reducing the turbulence induced by wind. The orientation of plug flow conduits 24a and 24b away from inlet and outlet chambers 16 and 26 reduces momentum of suspended pollutants or particulates and thus minimizes carry-over of the same in the base of container 12. Moreover, the chosen serpentine path for water separation permits the adjacent placement of inlet chamber 16 and outlet chamber 26 and their associated inlet pipe 14 and outlet pipe 30 in straight-through alignment for high-flow bypass or flow rate overflow control. This last is important in storm conditions exceeding the design capacity of treatment wherein the nominal flow capacity of the plug flow separation system is exceeded even momentarily.

Another advantage of excess stormwater flow bypass orientation, i.e. axially aligning inlet pipe 14 and outlet pipe 30, is that accumulated contaminants within first and second settling chambers 18 and 22 are not disturbed by the in-line, straight-through excess water when a bypass event occurs.

Those of skill will appreciate that the efficiency of a plug flow separation system is compromised if high flows greater than the nominal flow pass through settling chambers 18 and 22 or if baffle wall 32 therebetween is breached. The worst case is where the settling chambers are bypassed by way of baffle wall breach, since without overflow or bypass control, stormwater containing substantial sediment or contaminant will traverse the separation system. This worst case is avoided in accordance with one embodiment of the invention by providing an internal high-flow bypass mechanism in connection with the weir bypass wall that separates the aligned inlet and outlet chambers and their associated inlet and outlet pipes.

It may be seen from FIG. 3 that, in accordance with one embodiment of the invention, the treatment flow inlet 20 is generally rectangular in shape, as best shown in FIG. 3. This has been found optimally to direct water at a sufficient elevation within inlet chamber 16 to spill and flow into first settling chamber 18. Also in accordance with one embodiment of the invention, the width of rectangular treatment flow inlet 20 is a substantial fraction (e.g. more than approximately 50% and preferably approximately 70-90% and most preferably approximately 80%) of the internal width of first settling chamber 18, also as best shown in FIG. 3. Finally in accordance with one embodiment of the invention, the elevation of treatment flow inlet 20 corresponds substantially with a bottom elevation of inlet pipe 14, also as best shown in FIG. 3 The relatively wide, rectangular inlet at this elevation relative to first settling chamber 18 has been discovered to improve water flow through flow separation system 10 by reducing velocity and turbulence that otherwise frustrates settlement, thus to maximize performance of first settling chamber 18 in settling coarser solids, e.g. sand, grit, sediment and solid contaminants that are denser than water, at base 34 of flow container 12. (Those of skill in the art will appreciate that coarser, denser solids will tend to fall under the influence of gravity closer to inlet 20, while finer, lighter solids will tend to fall under the influence of gravity further from inlet 20.)

In accordance with one embodiment of the invention illustrated best in FIG. 1, one or more plug flow conduits are at an elevation substantially below the elevation of treatment flow inlet 20 and treatment flow outlet 28. This elevation has been determined uniquely to address a tradeoff between settling grit in the first settling chamber and floating floatables and oil in the first settling chamber (trapped, it will be understood, behind baffle wall 32). The elevation does so by disposing the plug flow conduits above the likely elevation of sediment and contaminant that typically will settle in the first settling chamber and within the substantial volume of stormwater at and above the conduits. This optimal relative elevation also will be referred to herein as being approximately intermediate base 34 and inlet/outlet pipes 14/30 of flow container 12.

The elevation and configuration of the plug flow conduits also prevents oil dispersed in and floatables floating on the surface of the stormwater from being conveyed through the plug flow conduits. Instead, such are floated to the surface of the water within the first settling chamber behind the baffle wall. Those of skill in the art will appreciate that the plug flow conduits' design controls the flow of water therethrough in accordance with known plug flow principles, effectively slowing the stormwater's velocity through settling chamber region 36 and enabling solids and floatables to be separated from cleaner water by gravity.

Those of skill will appreciate best from FIG. 3 that treatment flow inlet and outlet 20 and 28 in accordance with one embodiment of the invention are at an elevation approximately equal to the elevation of inlet pipe 14. Moreover, those of skill will appreciate from FIGS. 3 and 5 that the elevation of the treatment flow inlet relative the inlet pipe nominally submerges the treatment flow inlet in water. This relative elevation has been found to provide for optimal flow through flow container 12 of plug flow separation system 10. Those of skill also will appreciate best from FIG. 1 that the treatment flow outlet 28 is configured in a down-turned L shape (a so-called 'elbow' section) to cause water to flow upwardly and outwardly from second settling chamber 22 toward outlet chamber 26. (Those of skill will appreciate that, alternatively, treatment flow outlet 28 can be configured in an up-turned L shape, although such an alternative configuration is believed to be more subject to floating fines pollutant or contaminant from continuing downstream.) This shape for the conveyance from the second settling chamber (containing oil and other floatables on the surface of the water that is nominally higher in elevation than the bottom of water treatment outlet 28) to the outlet chamber has been found to provide a somewhat serpentine upward path for relatively clean water within the second settling chamber below the surface thereof containing oil and floatables.

Figure 4:
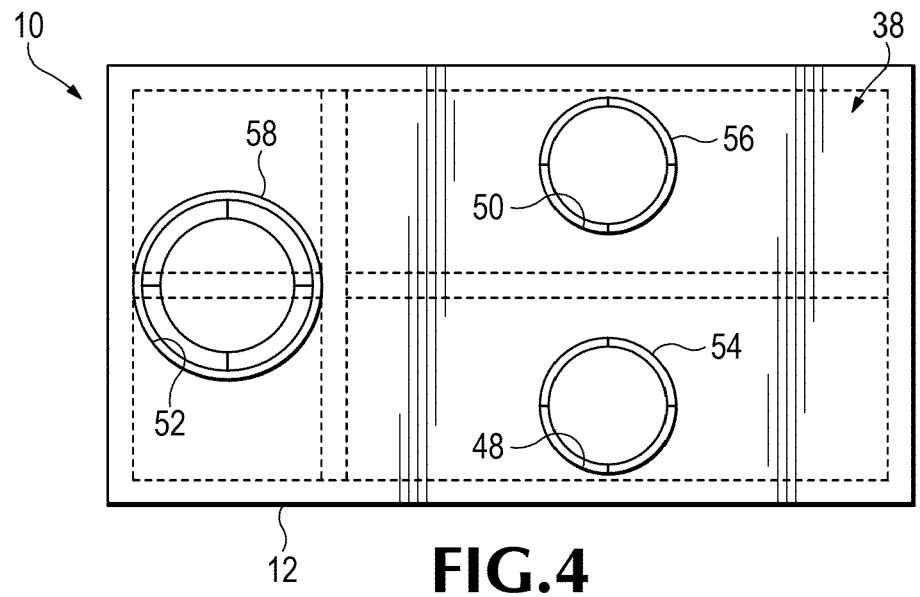
FIG. 4 is a top view similar to FIG. 2 but showing access holes and covers that are provided for below-ground installations of the invention.

FIG. 4 perhaps best illustrates plural (e.g. three) access holes 48, 50, and 52 respectively above first settling chamber 18, second settling chamber 22, and overflow mechanism 40. Such holes can be provided for below-ground installations of plug flow separation system 10 and are for accessing the respective chambers for periodic cleaning and/or troubleshooting. The plural holes can be covered during normal use with plural (e.g. three) lids 54, 56, 58, which lids can take the form of manhole covers. Those of skill in the art will appreciate that the first and second settling chambers can be cleaned by extending a vacuum hose down near the respective bottoms and/or tops thereof to remove sediment, contaminants, oil and floatables therefrom. Similarly, heavy sediment such as small river rock, pebbles, sand, or grit can be removed from one or both of inlet and outlet chambers 16 and 26 to completely clean and preventively maintain plug flow separation system 10. The access holes in accordance with one embodiment of the invention are dimensioned for human entry into the respective chambers as an alternative to simply extending a vacuum hose therethrough.

FIG. 5 illustrates plug flow separation system 10 in operation by way of a top view system block and flow diagram corresponding to FIG. 2. Stormwater will be understood normally to flow into inlet pipe 14 of flow container 12 and to flow into inlet chamber 16. The water level within inlet chamber 16 normally is below the elevation of weir bypass wall 42 of overflow mechanism 40. Accordingly, as the water rises, it flows through rectangular water treatment flow inlet 20 into first settling chamber 18. Larger and denser solids such as pebbles, sand, and grit settle to the bottom of the first settling chamber as the first settling chamber begins to fill with (in the case of start-up operation), or remains full of (in the case of normal operation), stormwater. At the same time, oil and floatables accumulate at the surface of the stormwater within the first settling chamber.

As the level of stormwater within first settling chamber 18 rises to or maintains at or above the elevation of one or more plug flow conduits 24a and 24b, relatively clean stormwater (containing only finer solids therein) flows through the conduits within baffle wall 32 into second settling chamber 22. At the same time, oil and floatables (i.e. floatable objects such as trash, plastic debris and the like) are trapped within first settling chamber 18 behind baffle wall 32 and settle on the surface of the stormwater within second settling chamber 22. (Those of skill will appreciate that oil and floatables cannot back out of first settling chamber 18 because, as the water level within inlet chamber 16 rises, water rises equally on first settling chamber 18 side of rectangular water treatment flow inlet 20 above its upper edge.) When the level of relatively clean stormwater within second settling chamber 22 rises to or maintains at or above the elevation of treatment flow outlet 28, clean stormwater flows therethrough and begins to flow out of outlet chamber 26 through outlet pipe 30. Oil and other floatables are trapped at the surface of first settling chamber 22 and behind baffle wall 32, and ultimately do not pass through treatment flow outlet 28 due to their oversize, specific gravity, and surface tension qualities.

As the level of clean stormwater within outlet chamber 26 rises to the elevation of outlet pipe 30, it begins to flow therethrough to a downstream location.

Larger solids, sediment, and grit remain trapped at the bottom (generally speaking) of first settling chamber 18; oil and floatables remain trapped at the top (generally speaking) of first settling chamber 18; and smaller lighter settleable solids settle at the bottom (generally speaking) of second settling chamber 22 until removed as described above by reference to FIG. 4. Thus, system 10 including flow container 12 effectively and space-efficiently separates sediment, pebbles, sand, grit, oil and floatables from upstream stormwater to produce cleaner downstream water.

During an unusually heavy storm or otherwise when the flow rate of stormwater into system 10 exceeds its flow rate capacity, the level of stormwater within inlet chamber 16 rises above the level of water treatment flow inlet 20 and cascades over weir bypass wall 42 into outlet chamber 26. The water flowing through outlet pipe 30 is a blend of water treated through the serpentine flow path through settling chamber region 36 and water cascading over weir 40. Accordingly, relatively untreated and thus sediment and/or contaminant-laden water is expelled from flow container 12 directly through outlet pipe 30. Those of skill in the art will appreciate that system 10 nevertheless even during such excessive demand is effective to the extent of its flow rate capacity to remove sediment and contaminant from the portion of the stormwater that traverses the serpentine settling chamber region 36 of flow container 12. Moreover, separated solids and contaminants remain trapped within flow container 12, unlike with prior art on-line vortex separation systems that permit washout thereof.

Those of skill in the art will appreciate that hydraulic loading rates are determined by a number of factors, including flow inlet and outlet dimensions, plug flow conduit diameters, targeted normal-operation flow rates, and first and second settling chamber capacities. Typically, the two important system design parameters in accordance with the invention are:

System Surface Overflow rate: 13 gallons per minute per square foot (gpm/sf) typically or within a 10-15 gpm/sf range Settling Chamber Length-to-width ratio (L:W): >3:1

All can be easily scaled up and down by those of ordinary skill in the art to accommodate desired site-specific and installation-specific goals, as is known. Those of skill in the art will appreciate that these parameters typically are traded off against other desirable goals such as smaller footprint and lower material requirements and attendant costs. Thus, it will be understood that, although a shallower and wider settling chamber might be desirable from an efficiency standpoint, nevertheless footprint and cost considerations recommend a lower width-to-depth ratio (W:D) than otherwise might be desired. Those of skill also will appreciate that providing two settling chambers connected in a serpentine path, in accordance with the invention, greatly improves plug flow separation efficiency while reducing footprint and cost.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A water separation system comprising:
   a flow container comprising:
   a water inlet pipe;
   an inlet chamber in fluid communication with the water inlet pipe;
   a first settling chamber configured to settle coarser solids and to float floatables;
   an elevated, horizontally-oriented, elongate-rectangular water treatment flow inlet leading from the inlet chamber to the first settling chamber, the flow inlet otherwise providing relatively unobstructed passage of the coarser solids therethrough;
   a second settling chamber configured to settle finer solids;
   one or more plug flow conduits leading from the first settling chamber to the second settling chamber;
   an outlet chamber;
   an elevated treatment flow outlet disposed between the second settling chamber and the outlet chamber; and
   a water outlet pipe in fluid communication with the outlet chamber.

2. The system of claim 1 further comprising:
   an overflow mechanism disposed between the inlet chamber and the outlet chamber.

3. The system of claim 2, wherein the overflow mechanism includes a weir bypass wall extending upwardly from the base of the flow container between the inlet chamber and the outlet chamber.

4. The system of claim 3, wherein an upper extent of the weir bypass wall is at an elevation substantially equal to an elevation of the middle of the inlet and outlet pipes.

5. The system of claim 3, wherein the flow container is generally rectangular in top plan view, the inlet and outlet pipes and inlet and outlet chambers and weir bypass wall occupying approximately a third of the rectangle on one end of the flow container and the first and second settling chambers occupying approximately two thirds of the rectangle on another end thereof, the one or more plug flow conduits being adjacent the far other end of the flow container.

6. The system of claim 1, wherein the treatment flow inlet and outlet are at an elevation approximately equal to an elevation of the inlet pipe.

7. The system of claim 1, wherein the one or more plug flow conduits are at an elevation substantially below the respective elevations of the treatment flow inlet and outlet.

8. The system of claim 1, wherein the one or more plug flow conduits are at an elevation approximately intermediate a base of the container and substantially equal elevations of the inlet and outlet pipes.

9. The system of claim 1, wherein each of the one or more plug flow conduits is configured to define a serpentine water flow path.

10. The system of claim 1, wherein the one or more plug flow conduits are generally U-shaped and lie in a substantially horizontal plane.

11. The system of claim 1, wherein each of the one or more plug flow conduits includes an plug flow inlet and a plug flow outlet, and wherein the plug flow inlets and outlets of the one or more plug flow conduits face away from the inlet and outlet chambers.

12. The system of claim 1, wherein a lower edge of the treatment flow inlet elevation corresponds substantially with a bottom elevation of the inlet pipe.

13. The system of claim 1, wherein a width of the treatment flow inlet is a substantial fraction of a width of the first settling chamber.

14. The system of claim 1, wherein the treatment flow outlet is configured in a down-turned L shape to cause water to flow upwardly and outwardly from the second settling chamber toward the outlet chamber.

15. The system of claim 1, wherein the elevation of the treatment flow inlet relative to the inlet and outlet pipes nominally submerges the treatment flow inlet in water.

16. The system of claim 1, wherein the inlet chamber, the first settling chamber, the second settling chamber and the outlet chamber are sequentially arranged to define a serpentine water flow path from the inlet pipe to the outlet pipe.

17. The system of claim 1, wherein the inlet chamber is disposed adjacent to the outlet chamber.

18. The system of claim 1 further comprising:
   a first interior baffle wall that extends upwardly from the base of the flow container between the first and second settling chambers, the baffle wall configured to subdivide a settling chamber region of the flow container and to trap therebehind coarser solids and floatables;
   a second interior wall separating the inlet chamber and the first settling chamber; and
   a third interior wall separating the second settling chamber and the outlet chamber.

19. The system of claim 1, wherein the one or more plug flow conduits are two in number.

20. The system of claim 1 further comprising:
   plural access holes disposed above at least one of the first and second settlement chambers and above at least one of the inlet and outlet chambers.

21. The system of claim 20, wherein the plural access holes are at least three in number, and wherein one is disposed above the first settlement chamber, another is disposed above the second settlement chamber, and at least a third is disposed above the inlet or outlet chamber.

22. The system of claim 21 further comprising:
   at least three covers configured to close the at least three access holes.

* * * * *